United States Patent
Minor et al.

(10) Patent No.: US 6,795,273 B2
(45) Date of Patent: Sep. 21, 2004

(54) MAGNETIC RECORDING HEAD WITH HIGH SATURATION MAGNETIZATION WRITE POLE HAVING ALTERNATING INTERFACE-DEFINING FE/CO LAYERS

(75) Inventors: Michael K. Minor, Gibsonia, PA (US); Timothy J. Klemmer, Sharpsburg, PA (US); Michael A. Seigler, Pittsburgh, PA (US); Arthur J. Freeman, Evanston, IL (US)

(73) Assignee: Quantum Materials Design, Inc., Evanston, IL (US)

( * ) Notice: Subject to any disclaimer, the term of this patent is extended or adjusted under 35 U.S.C. 154(b) by 0 days.

(21) Appl. No.: 10/337,113

(22) Filed: Jan. 6, 2003

(65) Prior Publication Data

US 2003/0133224 A1 Jul. 17, 2003

Related U.S. Application Data

(60) Provisional application No. 60/346,606, filed on Jan. 8, 2002.

(51) Int. Cl.[7] ............................ G11B 5/147; G11B 5/31
(52) U.S. Cl. ..................................................... 360/126
(58) Field of Search ................................ 360/125, 126, 360/317

(56) References Cited

U.S. PATENT DOCUMENTS

| | | |
|---|---|---|
| 4,756,816 A | 7/1988 | Liao et al. |
| 5,571,591 A | 11/1996 | Brady et al. |
| 5,777,828 A | 7/1998 | Kameyama et al. |
| 5,920,979 A | 7/1999 | Nepela et al. |
| 6,072,671 A | 6/2000 | Gill |
| 6,163,442 A | 12/2000 | Gill et al. |
| 6,219,209 B1 | 4/2001 | Gill |
| 6,278,590 B1 | 8/2001 | Gill et al. |
| 6,296,955 B1 | 10/2001 | Hossain et al. |
| 6,342,311 B1 | 1/2002 | Inturi et al. |
| 2002/0097537 A1 | 7/2002 | Shimazawa |
| 2003/0133223 A1 * | 7/2003 | Minor ......................... 360/125 |

FOREIGN PATENT DOCUMENTS

| | | | | |
|---|---|---|---|---|
| JP | 59014113 A | * | 1/1984 | ............ G11B/5/16 |
| JP | 01073603 A | * | 3/1989 | ............ G11B/5/31 |
| JP | 2001015339 A | * | 1/2001 | ............ G11B/5/31 |

OTHER PUBLICATIONS

X. Liu et al., "High Moment FeCoNi Alloy Thin Films Fabricated By Pulsed–Current Electrodeposition", *IEEE Trans. On Magn.*, vol. 37, No. 4, pp. 1764–1766 (Jul. 2001).

* cited by examiner

*Primary Examiner*—Craig A. Renner
(74) *Attorney, Agent, or Firm*—Benjamin T. Queen, II; Pietragallo, Bosick & Gordon

(57) ABSTRACT

A magnetic recording head includes a write pole having alternating layers of Fe and Co and a return pole magnetically coupled to the write pole. The layers of Fe may have a thickness from about 1.0 angstroms to about 40.0 angstroms and the layers of Co may have a thickness from about 1.0 angstroms to about 20.0 angstroms. The write pole may have a saturation magnetization greater than about 2.45 Tesla. A method for forming a write pole for a magnetic recording head is also disclosed.

8 Claims, 5 Drawing Sheets

MAGNETIC RECORDING HEAD WITH HIGH SATURATION MAGNETIZATION WRITE POLE HAVING ALTERNATING INTERFACE-DEFINING FE/CO LAYERS

CROSS REFERENCE TO RELATED APPLICATION

This application claims the benefit of U.S. Provisional Application No. 60/346,606 filed Jan. 8, 2002.

FIELD OF THE INVENTION

The invention relates to magnetic recording, and more particularly, to a magnetic recording head with a multilayer, high moment structure.

BACKGROUND OF THE INVENTION

Magnetic recording heads have utility in a magnetic disc drive storage system. Most magnetic recording heads used in such systems today are "longitudinal" magnetic recording heads. Longitudinal magnetic recording in its conventional form has been projected to suffer from superparamagnetic instabilities at densities above approximately 40 Gbit/in$^2$. It is believed that reducing or changing the bit cell aspect ratio will extend this limit up to approximately 100 Gbit/in$^2$. However, for recording densities above 100 Gbit/in$^2$, different approaches will likely be necessary to overcome the limitations of longitudinal magnetic recording.

An alternative to longitudinal recording is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a write pole having a small bottom surface area and a flux return pole having a larger bottom surface area. A coil having a plurality of turns is located adjacent to the write pole for inducing a magnetic field between that pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the material of the return pole does not affect the magnetic flux of the main write pole, which is directed vertically into the hard layer and the soft underlayer of the storage media.

Saturation magnetization is an important property of recording heads and is directly related to the areal density that may be achieved by a head-media combination. Therefore, in selecting a material or structure to form at least a portion of either a write pole of a longitudinal recording head or the write pole of a perpendicular magnetic recording head, it is desirable to have a material or structure that exhibits a large/high saturation magnetization ($4\pi M_s$), also generally referred to as "moment" or "magnetic moment". For example, one of the highest known saturation magnetizations at room temperature is exhibited by the bulk alloy $Fe_{65}Co_{35}$ which has a saturation magnetization value of approximately 2.45T. In view of the desire to continuously increase the areal density, it would be advantageous, therefore, to have a material or structure that has an enhanced or increased saturation magnetization value.

There is identified, therefore, a need for an improved magnetic recording head that overcomes limitations, disadvantages, and/or shortcomings of known magnetic recording heads. There is also identified a need for an improved material or structure having an enhanced saturation magnetization or moment in comparison to known materials or structures.

SUMMARY OF THE INVENTION

Embodiments of the invention meet the identified need, as well as other needs, as will be more fully understood following a review of the specification and drawings.

In accordance with an aspect of the invention, a magnetic recording head comprises a write pole having alternating layers of Fe and Co, and a return pole magnetically coupled to the write pole. The layers of Fe may have a thickness from about 1.0 angstroms to about 40.0 angstroms and the layers of Co may have a thickness from about 1.0 angstroms to about 20.0 angstroms. The write pole is able to achieve a saturation magnetization greater than about 2.45 Tesla.

In accordance with another aspect of the invention, an enhanced moment magnetic structure comprises a multilayer structure having alternating layers of xÅFe and yÅCo, wherein $1.0 \leq x \leq 40.0$ and $1.0 \leq y \leq 20.0$. The multilayer structure may have a thickness from about 50 angstroms to about 5,000 angstroms and is able to obtain a saturation magnetization greater than about 2.45 Tesla.

In accordance with yet another aspect of the invention, a method for forming a write pole for a magnetic recording head comprises depositing a layer of Fe on a substrate, depositing a layer of Co on the layer of Fe and then depositing additional layers of Fe and Co to form a multilayer structure. The depositing of the layers of Fe and Co may be performed by a physical vapor deposition process. The layers of Fe are deposited to have a thickness in the range from about 1.0 angstroms to about 40.0 angstroms and the layers of Co are deposited to have a thickness in the range from about 1.0 angstroms to about 20.0 angstroms. The write pole is formed to have a saturation magnetization greater than about 2.45 Tesla.

DETAILED DESCRIPTION OF THE INVENTION

The invention provides a multilayer, high moment structure, and more particularly may provide a magnetic recording head with a multilayer, high moment structure. The invention is particularly suitable for use with a magnetic disc drive storage system, although it will be appreciated that the multilayer, high moment structure may be used in other devices or systems where it may be advantageous to employ such a structure. A recording head, as used herein, is generally defined as a head capable of performing read and/or write operations. Longitudinal magnetic recording, as used herein, generally refers to orienting magnetic domains within a magnetic storage medium substantially parallel to the direction of travel of the recording head and/or medium. Perpendicular magnetic recording, as used herein, generally refers to orienting magnetic domains within a magnetic storage medium substantially perpendicular to the direction of travel of the recording head and/or recording medium.

Figure 1:
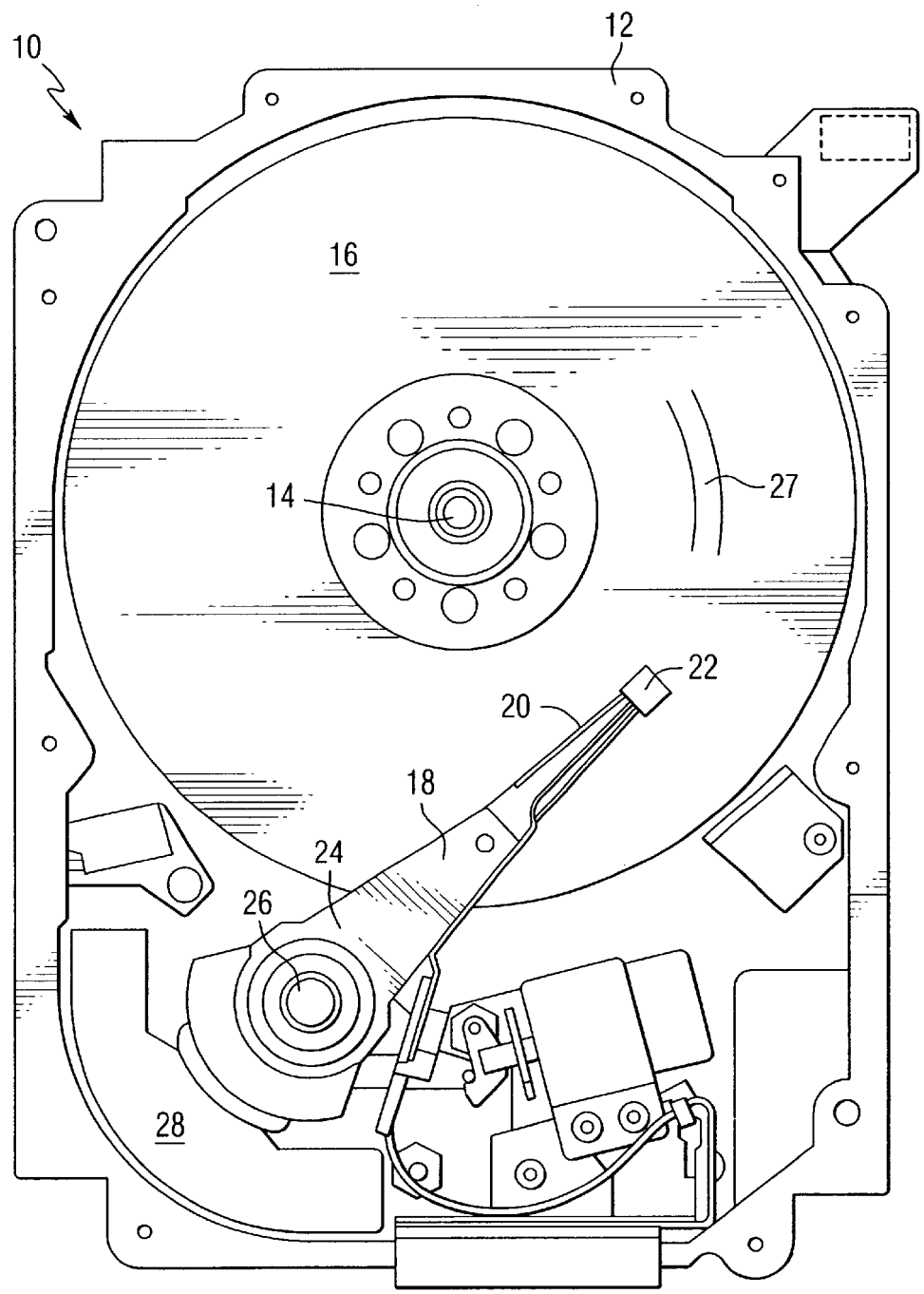
FIG. 1 is a pictorial representation of a disc drive system that may utilize a magnetic recording head in accordance with the invention.

FIG. 1 is a pictorial representation of a disc drive 10 that can utilize a perpendicular magnetic recording head in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing, in this case a magnetic disc. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
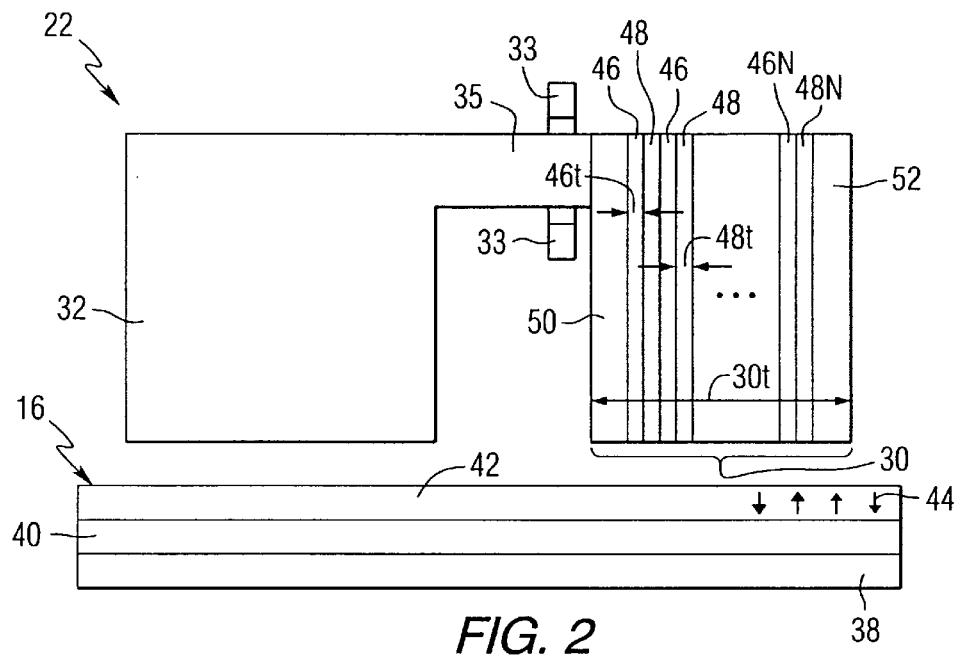
FIG. 2 is a partially schematic side view of a perpendicular magnetic recording head and a perpendicular magnetic recording medium in accordance with the invention.

FIG. 2 is a partially schematic side view of the magnetic recording head 22 constructed as a perpendicular recording head, and the recording medium 16 constructed as a perpendicular magnetic recording medium. Although an embodiment of the invention is described herein with reference to a perpendicular magnetic recording head, it will be appreciated that aspects of the invention may also be used in conjunction with other type recording heads, such as, for example, a longitudinal magnetic recording head. In addition, it will be appreciated that aspects of the invention may also be used in conjunction with other components of a magnetic recording system, such as, for example, forming a portion of the magnetic recording medium where it is advantageous to employ therein a high moment magnetic structure, such as a soft underlayer used with perpendicular recording media. Specifically, the recording head 22 includes a writer section comprising a write pole 30 and a return or opposing pole 32 that are magnetically coupled by a yoke or pedestal 35. A magnetizing coil 33 surrounds the yoke or pedestal 35 for energizing the recording head 22. The recording head 22 also includes a read head, not shown, which may be any conventional type read head as is generally known in the art.

Still referring to FIG. 2, the perpendicular magnetic recording medium 16 is positioned under the recording head 22. The recording medium 16 includes a substrate 38, which may be made of any suitable material such as aluminum, ceramic glass or amorphous glass. A soft magnetic underlayer 40 is deposited on the substrate 38. The soft magnetic underlayer 40 may be made of any suitable material having, for example, a relatively high moment and high permeability, such as FeCo, NiFeCo or an Fe—Co multilayer. A hard magnetic recording layer 42 is deposited on the soft underlayer 40, with the perpendicular oriented magnetic domains 44 contained in the hard layer 42. Suitable hard magnetic materials for the hard magnetic recording layer 42 may include at least one material selected from CoCr, FePd, CoPd, CoFePd, CoCrPd, or CoCrPt.

In accordance with the invention, the write pole 30 is a laminated or multilayer structure. Specifically, the write pole 30 includes alternating layers 46 of Fe and layers 48 of Co. The alternating layers 46 and 48 may be repeated up to 46N and 48N times where N=1, 2, 3 . . . such that the write pole 30 may have a thickness 30t in the range from about 50 angstroms to about 5,000 angstroms. The layer 46 of Fe may have a thickness 46t in the range from about 1.0 angstroms to about 40.0 angstroms. The layer 48 of Co may have a thickness 48t in the range from about 1.0 angstroms to about 20.0 angstroms.

The write pole 30 may also include an underlayer 50 which serves as a texture enhancing layer which can enhance certain crystallographic textures in the write pole 30. This texture enhancement can improve the magnetic properties of the write pole 30, which is desirable. The underlayer 50 may be formed of, for example, NiFeCr, Cr, MgO or other similar materials for providing the texture enhancement. The underlayer 50 may have a thickness in the range from about 20 angstroms to about 200 angstroms.

The write pole 30 may also include a cap layer 52 to prevent oxidation of the layers 46 and 48 that form the write pole 30. The cap layer 52 may be formed of, for example, NiFeCr, Ta, Cr, MgO or any other similar material with oxidation resistance.

To illustrate the invention, reference is made to FIGS. 3–7. Specifically, the write pole 30, as described herein, is illustrated by forming two film sets with the following structures:

Si\SiO$_2$\Fe$_n$Co\50 Å NiFeCr cap  n = 1, 2, 3, 3.5, 4, and 5 (Film Set 1)
Si\SiO$_2$\50 Å NiFeCr underlayer\Fe$_n$Co\50 Å NiFeCr cap  n = 1, 2, 3, 3.5, 4, and 5 (Film Set 2)

Generally, Film Sets 1 and 2 were prepared via dc magnetron physical vapor deposition (i.e., dc magnetron sputtering) from pure Fe and Co targets. The deposition pressure was 3.0 mTorr and ultra high purity argon was used as the process gas. The substrates were 150 mm round Si (100) with 5,000 Å of thermal oxide. The Fe—Co multilayered structure was formed by positioning the substrate under the Fe target where n×3.5 angstroms (wherein n=1, 2, 3, 3.5, 4 and 5) was deposited. The substrate was then positioned under the Co target where 3.5 angstroms was deposited. This process was repeated until a total film thickness of approximately 1000 angstroms was achieved. It will be appreciated that the thickness of the layers 46 of Fe and the layers 48 of Co may be varied in accordance with the thickness ranges set forth herein and that the total film thickness, i.e., the thickness of the write pole 30, may also be varied in accordance with the thickness range set forth herein.

In order to compare the nominal and measured Co a/o for the depositions used to form the Film Sets 1 and 2 described herein, the chemical composition was measured via energy dispersive spectrometry (EDS). Table 1 shows the film and the nominal and measured Co content:

TABLE 1

Nominal And Measured Co Content For As-Deposited FeCo MLs

| Film | Nominal Co (a/o) | Measured Co (a/o) |
|---|---|---|
| FeCo | 50.0 | 51.0 |
| $Fe_2Co$ | 33.3 | 34.6 |
| $Fe_3Co$ | 25.0 | 26.3 |
| $Fe_{3.5}Co$ | 22.2 | 22.4 |
| $Fe_4Co$ | 20.0 | 19.8 |
| $Fe_5Co$ | 16.7 | 18.3 |

EDS is generally considered to be accurate within about 2 atomic percent (a/o), therefore, the data shows that the Co content and the multilayer structures that comprise the films is close to that which was targeted.

Figure 3:
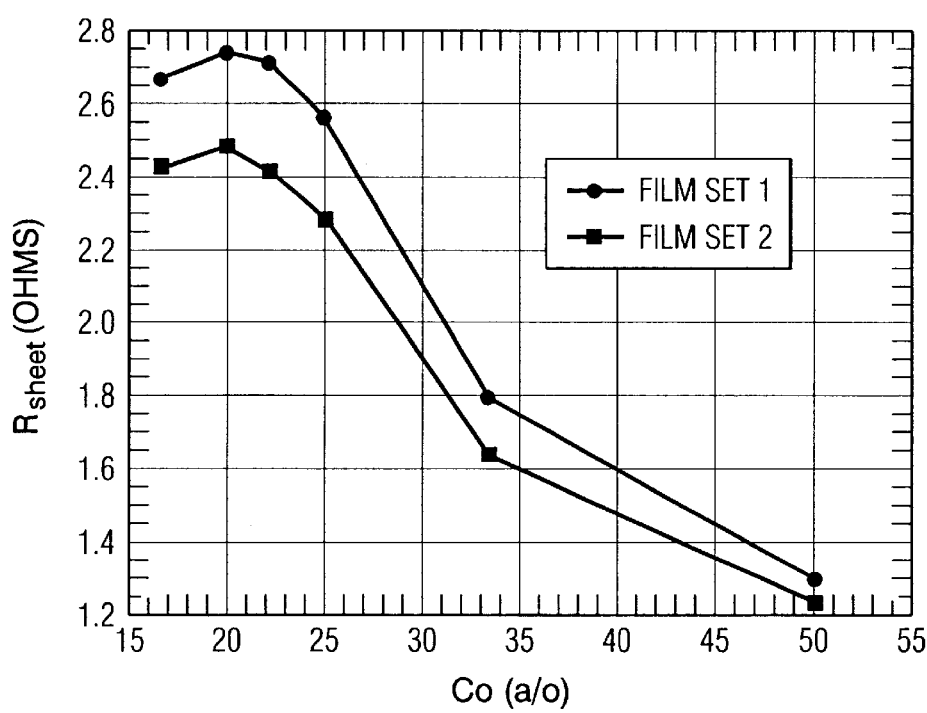
FIG. 3 illustrates sheet resistance versus Co content for film sets constructed in accordance with the invention.

FIG. 3 illustrates the sheet resistance for Film Set 1 and Film Set 2 versus the nominal Co content. Specifically, FIG. 3 illustrates that both sets of films exhibit a similar trend with a peak in sheet resistance at approximately 20 a/o of Co ($Fe_4Co$). Advantageously, this is a similar trend as exhibited by FeCo bulk alloys. In addition, for a given Co content, FIG. 3 illustrates that Film Set 2 having the NiFeCr underlayer exhibits a lower sheet resistance than Film Set 1 that is formed without the underlayer.

Figure 4A:
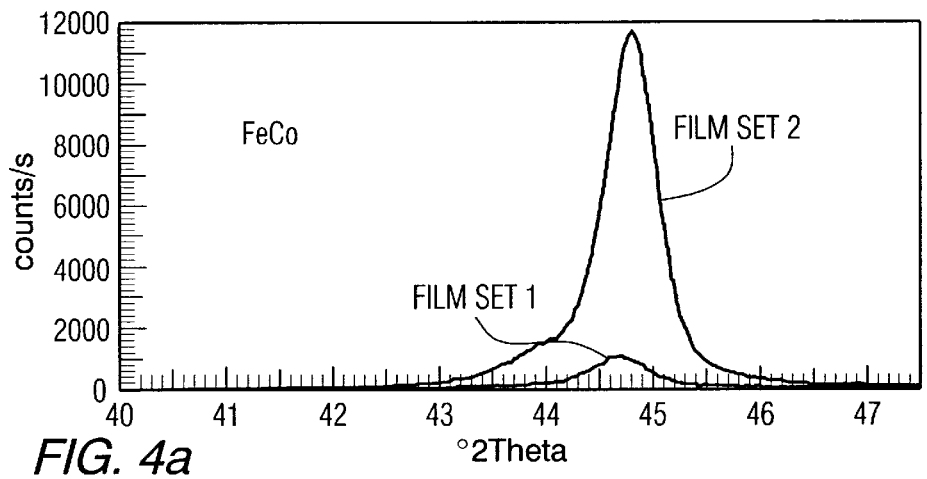
FIGS. 4a–4c illustrate high-angle X-ray diffraction scans for film sets constructed in accordance with the invention.
Figure 4B:
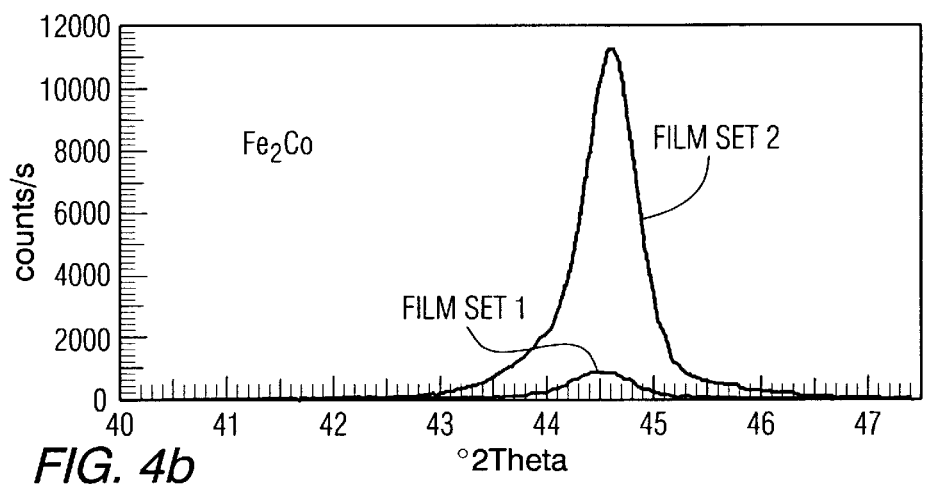
Figure 4C:
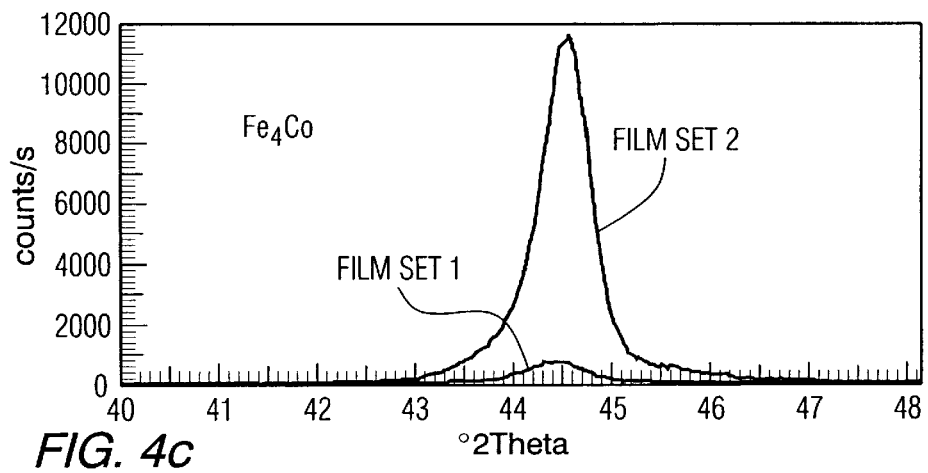

FIGS. 4a–4c illustrate high angle X-ray diffraction scans for FeCo, $Fe_2Co$, and $Fe_4Co$ for Film Sets 1 and 2. These figures illustrate the (110) BCC α-Fe peak for the Film Sets 1 and 2. Specifically, FIGS. 4a–4c illustrate that the intensity of the (110) peak of the films with the NiFeCr underlayer, i.e., Film Set 2, is larger than the films with no underlayer. In addition, as more Fe is added, the d-spacing between the interatomic planes normal to the film plane become larger which is also existent in FeCo bulk alloys.

Figure 5A:
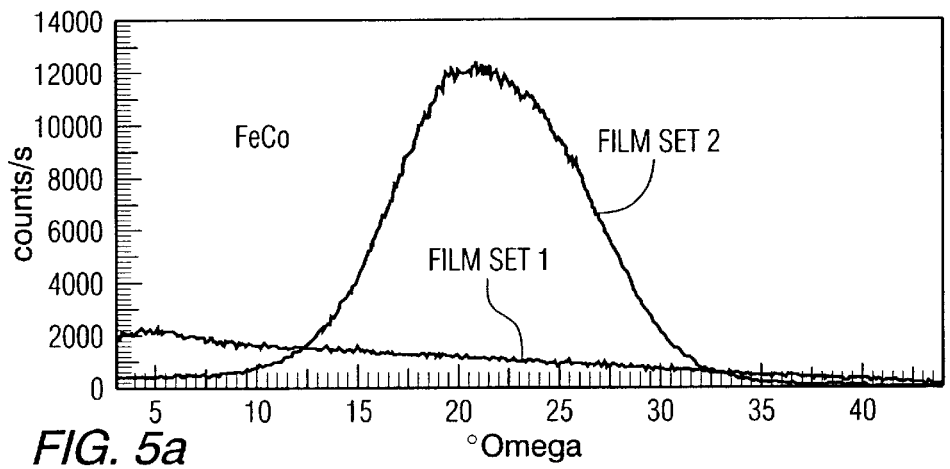
FIGS. 5a–5c illustrate rocking curves for film sets constructed in accordance with the invention.
Figure 5B:
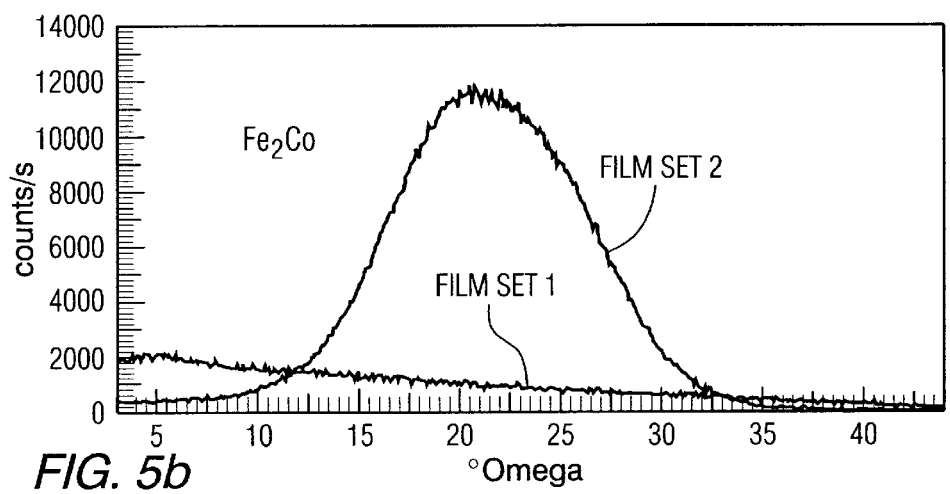
Figure 5C:
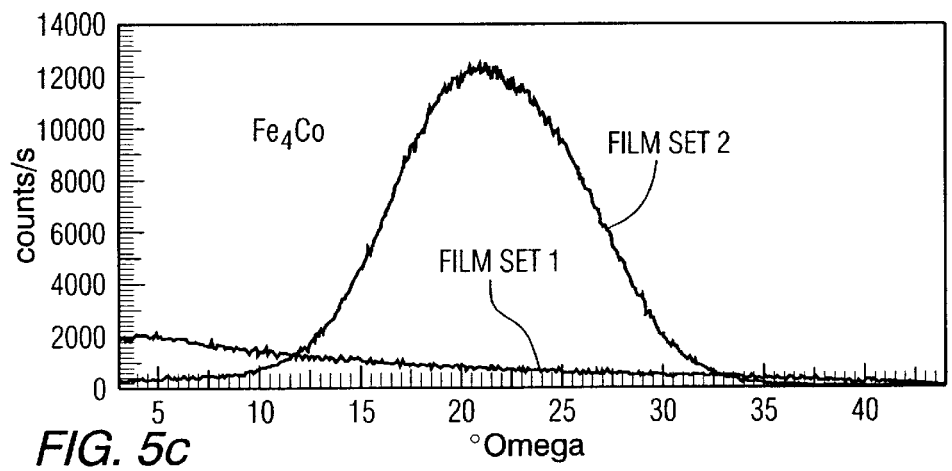

FIGS. 5a–5c illustrate the rocking curves for the same films illustrated in FIGS. 4a–4c. Specifically, these figures illustrate that the films having the NiFeCr underlayer, i.e., Film Set 2, have some degree of an in-plane (110) texture while the films without the underlayer, i.e., Film Set 1, are more randomly oriented in the plane of the film. Presumably, the NiFeCr underlayer exhibits a lattice which promotes the (110) texture of the FeCo multilayers. Other orientations of the FeCo multilayers are possible which may or may not exhibit higher magnetization. An example of this would be the (100) orientation of the FeCo multilayers formed on an MgO underlayer.

Figure 6:
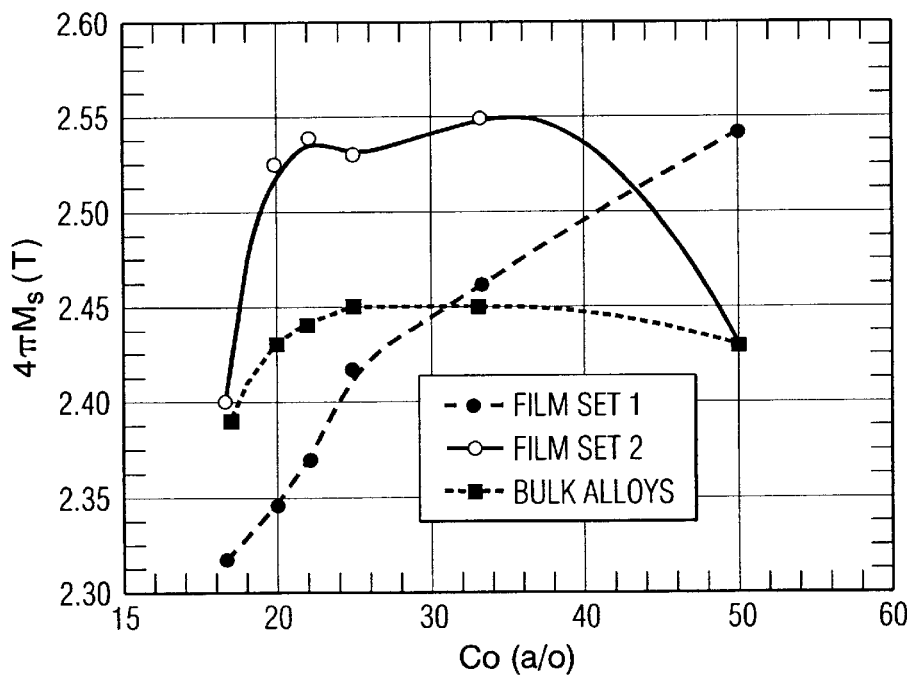
FIG. 6 illustrates saturation magnetization ($4\pi M_s$) versus Co content for film sets constructed in accordance with the invention and for bulk alloys.

FIG. 6 illustrates the saturation magnetization ($4 \pi M_s$) of the Film Sets 1 and 2 and FeCo bulk alloys versus Co content. The saturation magnetization was measured on a SQUID magnetometer. To measure the saturation magnetization, a method was employed which applies a field normal to the plane of the film. This is essentially the demag field which is approximately equal to the saturation magnetization when the film is saturated. Specifically, FIG. 6 illustrates the FeCo bulk alloys which exhibit the highest known saturation magnetization at ambient temperature, e.g., 2.45 Tesla. FIG. 6 also illustrates that the multilayer structure without an underlayer, i.e., Film Set 1, exhibit an enhanced moment above about 2.45 Tesla at approximately greater than about 32 a/o of Co. For example a moment of approximately 2.47 Tesla for about 33 a/o of Co and a moment of approximately 2.54 Tesla for about 50 a/o of Co. The multilayer structures having an underlayer, i.e., Film Set 2, exhibit an enhanced moment over a wide region of Co concentrations, e.g., between about 17 a/o Co and about 48 a/o Co. For example a moment of approximately 2.53 Tesla for about 20 a/o of Co and a moment of approximately 2.55 Tesla for about 33 a/o of Co. This indicates that the crystallographic orientation of the films is important for the moment enhancement. Accordingly, it will be appreciated that by forming a structure, such as write pole 30, having alternating layers of Fe and Co that a saturation magnetization greater than about 2.45 Tesla can be obtained.

Figure 7:
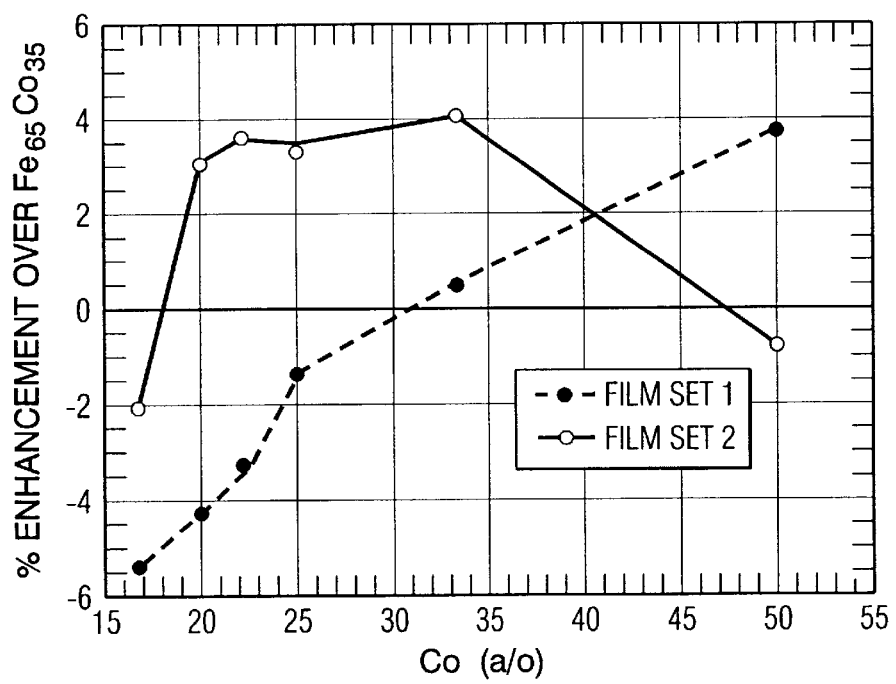
FIG. 7 illustrates saturation magnetization enhancement over $Fe_{65}Co_{35}$ versus Co content.

FIG. 7 illustrates the percent enhancement in saturation magnetization compared to a $Fe_{65}Co_{35}$ bulk alloy having a saturation magnetization of 2.45 Tesla at ambient temperature versus Co content for Film Sets 1 and 2 constructed in accordance with the invention. Specifically, FIG. 7 illustrates that a saturation magnetization or moment enhancement of approximately 4% over the highest known saturation magnetization exhibited by the $Fe_{65}Co_{35}$ can be obtained by forming a structure having alternating layers of Fe and Co in accordance with the invention.

For the Film Sets 1 and 2, the enhanced saturation magnetization results at least in part from two competing effects: the large enhancement of the magnetic moments of the Fe atoms adjacent to Co atoms and the rapid loss of the enhanced Fe moment values back to their Fe bulk moment value for atoms away from the Fe—Co interface. The Co moments are not as sensitive to their environment and are not much different from their bulk value. However, in the multilayer structure of the present invention, a balance is achieved with variation of the relative number of Fe to Co layers as an added degree of freedom. An important advantage of the multilayer structures of the present invention over bulk alloys comes from the reduced dimensionality of the Fe and Co atoms in the layered structures. This enhances the electronic density of states to enhance both their spin and orbital magnetic moments which leads to the enhancement of the moment observed in the multilayered structures of the present invention.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A magnetic recording head, comprising:
    a write pole having alternating layers of Fe and Co with an Fe—Co interface therebetween, wherein said write pole has a saturation magnetization greater than about 2.45 Tesla; and
    a return pole magnetically coupled to said write pole.

2. The magnetic recording head of claim 1, wherein said write pole has a thickness from about 50 angstroms to about 5,000 angstroms.

3. The magnetic recording head of claim 1, wherein the layer of Fe has a thickness from about 1.0 angstroms to about 40.0 angstroms.

4. The magnetic recording head of claim 1, wherein the layer of Co has a thickness from about 1.0 angstroms to 20.0 angstroms.

5. The magnetic recording head of claim 1, wherein said write pole includes means for preventing oxidation of said write pole.

6. The magnetic recording head of claim 5, wherein said means for preventing oxidation includes a cap layer formed on said write pole, said cap layer formed of a material selected from the group consisting of NiFeCr, Ta, Cr or MgO.

7. The magnetic recording head of claim 1, wherein said write pole includes an underlayer formed of a material selected from the group consisting of NiFeCr, Cr or MgO.

8. The magnetic recording head of claim 7, wherein said underlayer has a thickness in the range from about 20 angstroms to about 200 angstroms.

* * * * *